United States Patent [19]
Muller et al.

[11] 3,879,000
[45] Apr. 22, 1975

[54] VACUUM CUTTING MEAT PROCESSING MACHINE

[76] Inventors: Hellmut Muller, 7969 Hohentengen In der Haue 6; Herbert Muller, 7947 Mengen am Holderstock 40, both of Germany

[22] Filed: Nov. 27, 1973

[21] Appl. No.: 419,419

[30] Foreign Application Priority Data
Sept. 22, 1973  Germany............................ 2347853
Dec. 2, 1972  Germany............................ 2259126

[52] U.S. Cl. ... 241/282.1; 241/199.7; 241/DIG. 14; 241/DIG. 33
[51] Int. Cl. ...................... B02c 18/12; B02c 18/18
[58] Field of Search............. 241/199.6, 199.7, 277, 241/282.1, 282.2, DIG. 14, DIG. 33

[56] References Cited
UNITED STATES PATENTS

| | | |
|---|---|---|
| 1,583,755 | 5/1926 | Schmidt...................... 241/199.7 X |
| 2,246,054 | 6/1941 | Marty............................. 241/277 X |
| 2,894,551 | 7/1959 | Otto........................... 241/282.1 UX |
| 2,934,115 | 4/1960 | Grebe............................. 241/199.6 |
| 3,001,563 | 9/1961 | Karpf.............................. 241/199.7 |
| 3,548,901 | 12/1970 | Schaller........................... 241/199.6 |
| 3,764,081 | 10/1973 | Seydelmann..................... 241/199.7 |

*Primary Examiner*—Granville Y. Custer, Jr.
*Assistant Examiner*—Howard N. Goldberg
*Attorney, Agent, or Firm*—Max Fogiel

[57] ABSTRACT

A meat processing machine with vacuum cutting arrangement in which a bowl is rotatable about its axis of symmetry. A rotating work processing tool in the bowl is held by a carrier supported by a bearing block located on the axis of the bowl. A transparent hood covers the bowl and tool carrier. The cutting means include a cutting shaft for supporting the tool, and at least a portion of the cutting means is completely in vacuum.

15 Claims, 7 Drawing Figures

VACUUM CUTTING MEAT PROCESSING MACHINE

BACKGROUND OF THE INVENTION

The present invention relates to a meat processing machine, in particular, a vacuum cutter, with a rotatable bowl which is rotationally symmetric about its axis of rotation. A work processing tool rotates and reaches into the bowl, and the work tool is held by a cutting carrier. A hood covers the bowl and the cutting carrier.

In meat processing machines of the preceding species, a rim-shaped bowl is usually used. The bowl is rotatably mounted on the machine structure about its normal axis of symmetry. The work tool which has usually several hook-shaped knives, is mounted on a rotating cutting shaft and reaches into the bowl from above, eccentric to the rotational axis of the bowl. The meat or similar matter which is introduced, is in this manner chopped, cut and mixed. The drive and bearings of the cutting shaft are, thereby, mounted on the outside of the bowl on the machine structure, and the cutting shaft extends over and above the external rim of the bowl. Within the processing region, the cutting shaft is straddled by a cutting shaft cover which prevents the processed material from being squirted outward.

In such vacuum cutters, the processing parts as the bowl, cutting shaft and cutting cover are enclosed in an additional vacuum receptacle. The construction which is required for this arrangement is, thereby, relatively large. Particular difficulty arises from the sealing off of the rapidly rotating cutting shaft which passes through the wall of the vacuum housing. Since the drive and support of the work tool is always passed over the external rim of the bowl, a relatively blocked arrangement is attained, and the entrance space is not always freely accessible for controlling and monitoring purposes.

SUMMARY OF THE INVENTION

Accordingly, it is an object of the present invention, to provide a meat processing machine of a simple and compact species which makes possible particularly dependable and operationally safe sealing of the vacuum housing.

To achieve the object of the present invention, the meat processing machine of the preceding species has at least a mechanical part of the cutting drive for the cutting shaft arranged in a vacuum chamber.

In this manner, it is avoided that a rapidly rotating shaft must be passed through the wall of the vacuum housing. In principle, the rotating mechanism for the bowl can also be located in vacuum. The rotational speed of the bowl, however, is usually, so low that a slow-running dynamic seal may be provided. Such a seal allows for long operating duration and is subjected only to negligible wear. The cutting carrier of the cutting shaft may be arranged in a compact manner so that it can be readily located in vacuum. It is only necessary to provide, thereby, that no large heat generation takes place, or that the heat can be conducted away in a predetermined manner.

It is advantageous that the cutting carrier holding the work tool be arranged on a bearing block located on the rotational axis of the bowl. In this manner, it is achieved that the drive has no parts projecting outward, and the entire machine can be made in compact form and be accessible equally well from all sides.

The bowl can be sealed off, thereby, with respect to the hood by means of a static seal, and by a dynamic seal with respect to the bearing block. This dynamic seal also runs so slowly that it is not subjected to substantial wear, whereby it can retain the vacuum dependably. The diameter of the seal can be made many times smaller than the external rim of the bowl.

In another embodiment, the vacuum chamber with the air-tight closed-off inner space is in communication with a tool driving motor mounted on the outside of the vacuum housing. The vacuum housing can be basically constructed in any desired manner, and the tool driving motor can be mounted as desired, without impairing thereby the vacuum. In any case, the motor housing can be designed so that it can be readily cooled. A remotely-cooled motor can, for example, be used.

In using a bearing block, the tool driving motor can be mounted at the lower end of the bearing block, and the cutting drive can pass through the bearing block. Thus, the shaft carrying the work tool can be connected, for example, with the driving motor by means of belt and pulley means which are interconnected by a reversing shaft arranged transversely to the axis of the bowl at the upper end of the bearing block. The entire mechanical force transmission occurs here in vacuum and is, thereby, substantially free of noise. This is significant with regard to goals set by the trade organization. By spacing and arranging the individual shafts of the belt drive, it is possible to sustain also large tolerances.

In accordance with another embodiment, the housing of a tool driving motor may be surrounded by a vacuum-type double cover, and the double cover chamber may be made to communicate with a cooling circuit by means of inlet and exit channels provided in the bearing block. The arrangement may be such that the double cover chamber is subdivided by at least one separating wall into a cooling loop. Both ends of the loop are respectively connected with the inlet and exit channels. It is of advantage that this separating wall extends along the under side of the motor and in the longitudinal direction of the motor.

In accordance with another embodiment, the bearing block is arranged on an intermediate wall. This intermediate wall is closely inserted beneath the bowl in a machine frame. The vacuum pump and in some cases the cooling medium conveying means are located beneath this intermediate wall. In this manner, the size of the vacuum chamber is also maintained substantially small, when the hood is seated upon the rim of the bowl by means of a static seal enclosing the vacuum-type housing part. Any suitable cooling medium can also be used in place of air.

Cooling is fully unnecessary when the cutting drive power is taken from the rotational motion of the bowl. The heat resulting, thereby, in the bearings and mechanism can usually be emitted to the exterior by means of radiation. Furthermore, there is usually sufficient time for cooling between individual chargings of the machine for processing.

In principle, it is necessary to hold only a pinion shaft at the upper end of the bearing block. This pinion shaft has a pinion which meshes with a gear on the bowl. The pinion shaft should possibly also have in conjunction therewith, a shifting mechanism for shifting stepwise the rotational speed. It is preferable that a mechanism with variable shifting be provided for this purpose, in order to achieve the required high cutting speeds and the speeds that correspond to varying speeds of the bowl.

It is also possible to apply the drive for the cutting mechanism by means of magnetic forces transmitted through an air-tight nonmagnetic wall. This arrangement can be in the form of a magnetic coupling, but such a nonmagnetic wall can also separate the rotor and stator of a disc-type electrical motor.

The hood is pivotably held at its center by a pivoting arm along the rotational axis of the bowl. The pivot arm for the hood is pivotably on an axis which is outside of the processing chamber. The hood can be made of transparent material and has preferably a semispherical shape.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
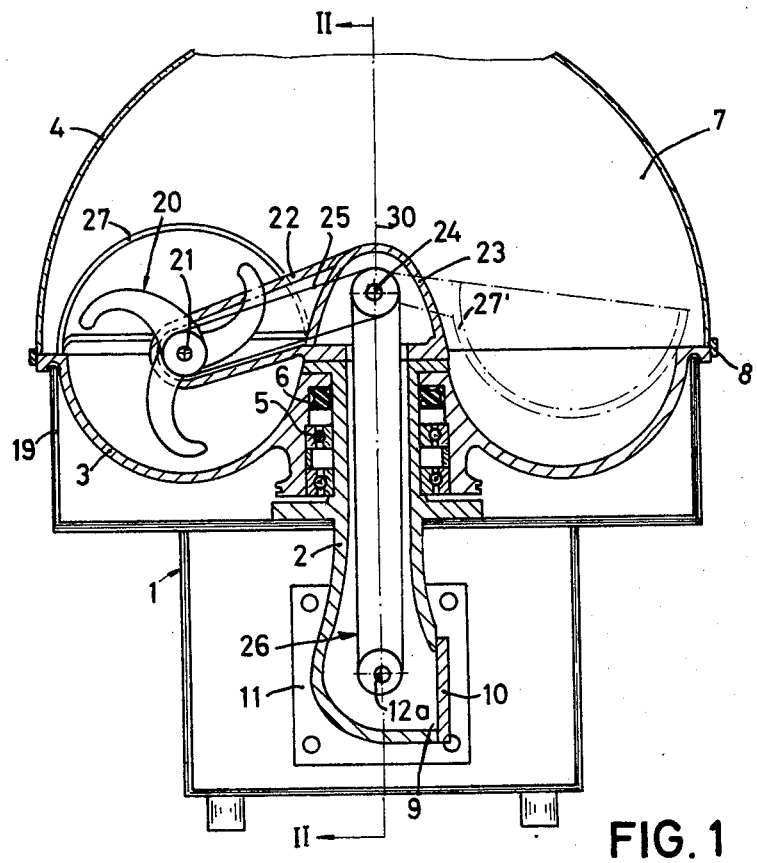
FIG. 1 is a sectional elevational view of the meat cutter taken along line 1—1 in FIG. 2, in accordance with the present invention.
Figure 4:
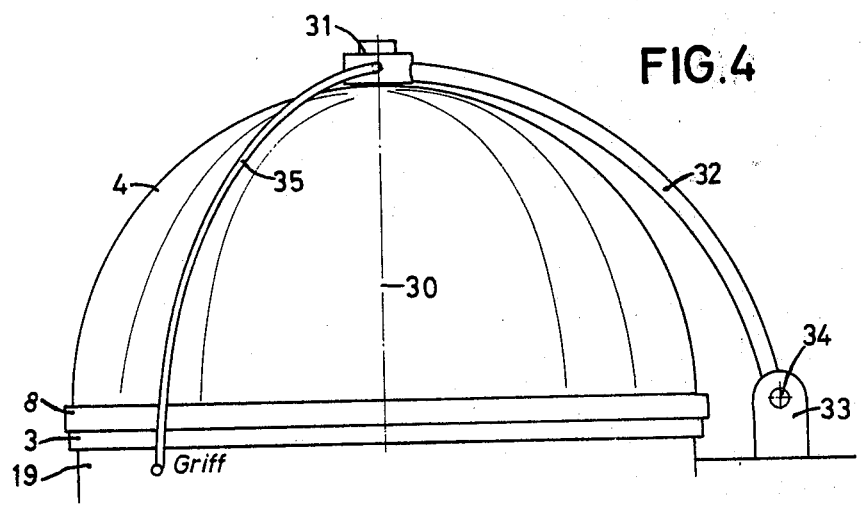
FIG. 4 is a partial side view of the cutter when viewed from below in FIG. 3.
Figure 2:
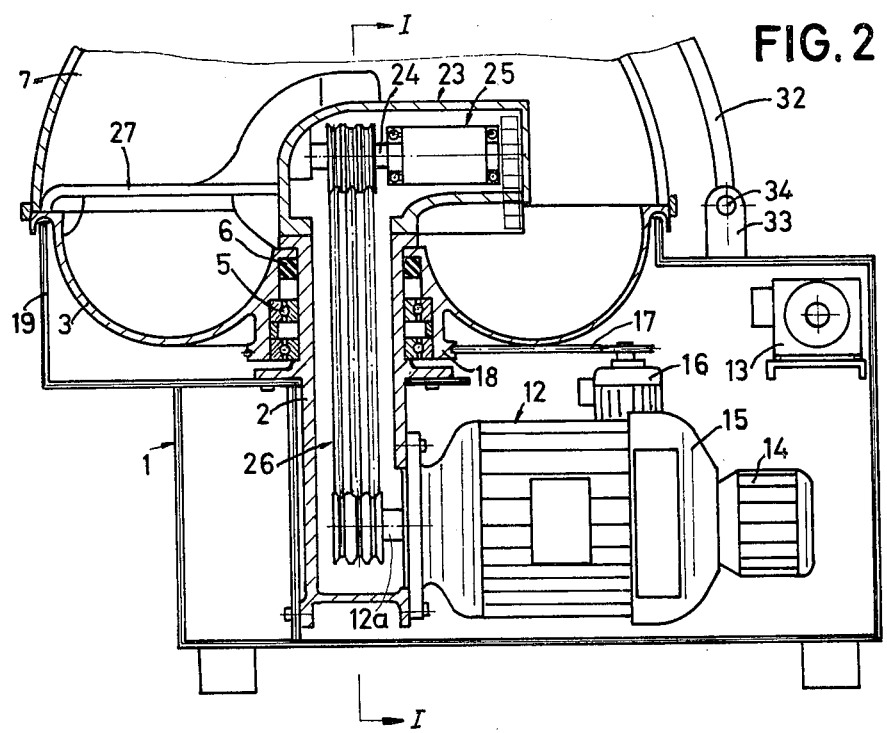
FIG. 2 is a sectional view taken along line 11—11 in FIG. 1.
Figure 3:
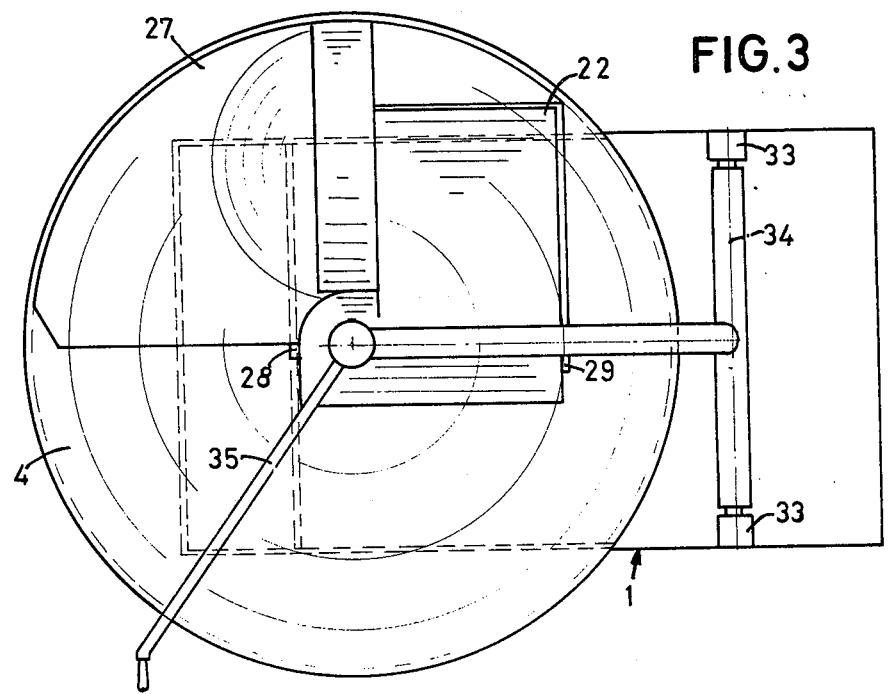
FIG. 3 is a plan view of the cutter when viewed from above in FIG. 2.

Referring to the drawing, the machine structure is generally indicated as 1, and has secured to it a strong tube-shaped bearing block 2. The bearing block carries rotatably a ring bowl 3 which is covered by a semispherically-shaped hood or dome 4 which is made of transparent material.

Two ball bearings 5 serve to hold the bowl on the bearing tube. A dynamic seal 6 of conventional construction is applied over the two ball bearings 5. A sealing ring 8 between the bowl and the hood, seals the processing chamber 7 off from the outside. The sealing ring 8 is secured on the outside below the rim of the hood.

An assembly opening 9 is provided at the lower end of the bearing block 2 in a sidewise manner, and is sealed off airtight to a cover 10. An operating opening is provided perpendicular to the assembly opening 9, and is surrounded by a flange 11, to which an electrical motor 12 is attached. This motor 12 has a sealed airtight housing whose interior space communicates with the processing chamber 7 to the hollow bearing block. The interconnected chamber constructed in this manner is sealed airtight on all sides, and can be subjected to vacuum by a vacuum pump 13 which is connected to the bearing block 2 in a manner not shown. The rotor of the motor 12 runs, thereby, in vacuum. For remote ventilation of the stator, serves a separate ventilating motor 14 which applies cooling air to the exterior cooling ribs or fins of the motor housing, by means of a ventilating wheel over a deflection cap 15.

A driving motor 16 serves for driving the bowl 3. The driving motor 16 actuates a lower ring flange 18 of the bowl, through a V-belt 17. The rotational speed of the bowl is of only several RPM. The exterior rim of the bowl is not connected with the projecting ring portion 19.

The ring portion of the bowl has a substantially semicircular shaped cross section. The work tool 20 has here the shape of three hook-shaped cutting arms, and is mounted on a cutting shaft 21 which is held on a head member 23 by a radially projecting carrying arm 22 which is displaced sidewise with respect to the axial plane. The head member 23 is secured at the top end of the bearing block 2, and carries there a reversing shaft 24 which is perpendicular to the bowl axis 30 or to the axis of the bearing block 2.

The cutting shaft 21 is connected to the reversing shaft, by a belt drive 25. A V-belt drive 26 with 3 V-belts is arranged at the interior of the bearing 2 and serves to couple the reversing shaft 24 with the motor shaft 12a. The motor shaft is, thereby, driven exclusively by the motor through belts, even through the work tool operates within a surrounding chamber that is hermetically sealed.

The work tool and the sidewise bordering operating region are covered by a cutting shaft cover 27 which is centrally pivoted with respect to the reversing shaft 24 by means of two bearing lugs 28, 29. The cover 27 is substantially rotatable through 180° and into the position 27' which is designated by dash-dot lines in FIG. 1. In this position 27', the cover can be conveniently cleaned.

The hood 4 is connected to a pivoting arm 32 by means of a rotatable bearing 31, at the middle of the hood and centrally to the axis 30 of the bearing block 2. The pivoting arm 32 is held in bearings 33 provided on the machine structure, and it is pivotable about an axis 34 which is perpendicular to the axis of rotation 30. A servicing lever 35 which is bent toward the front in a curved manner along a meridian of the bowl or hood 4, serves to simplify the servicing operation. It is also possible to attach in a flanged manner the motor from below and to an upper part of the bearing block, and to drive the cutting shaft directly through an extension of the motor shaft.

Figure 5:
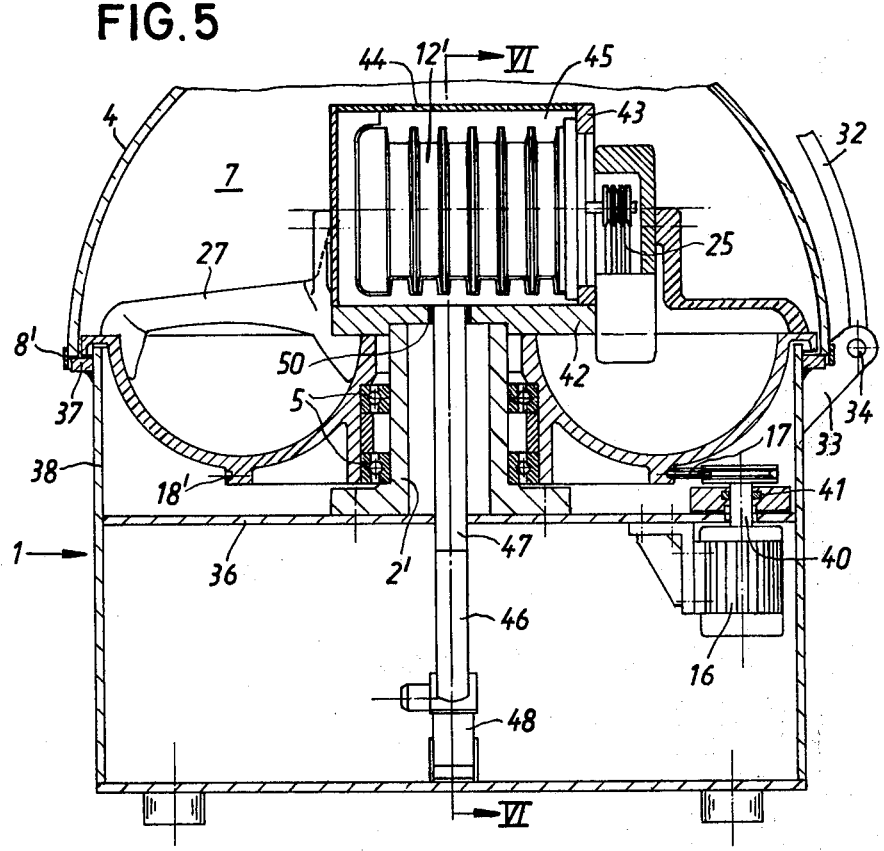
FIG. 5 is a sectional view of a vacuum cutter in accordance with the present invention.
Figure 6:
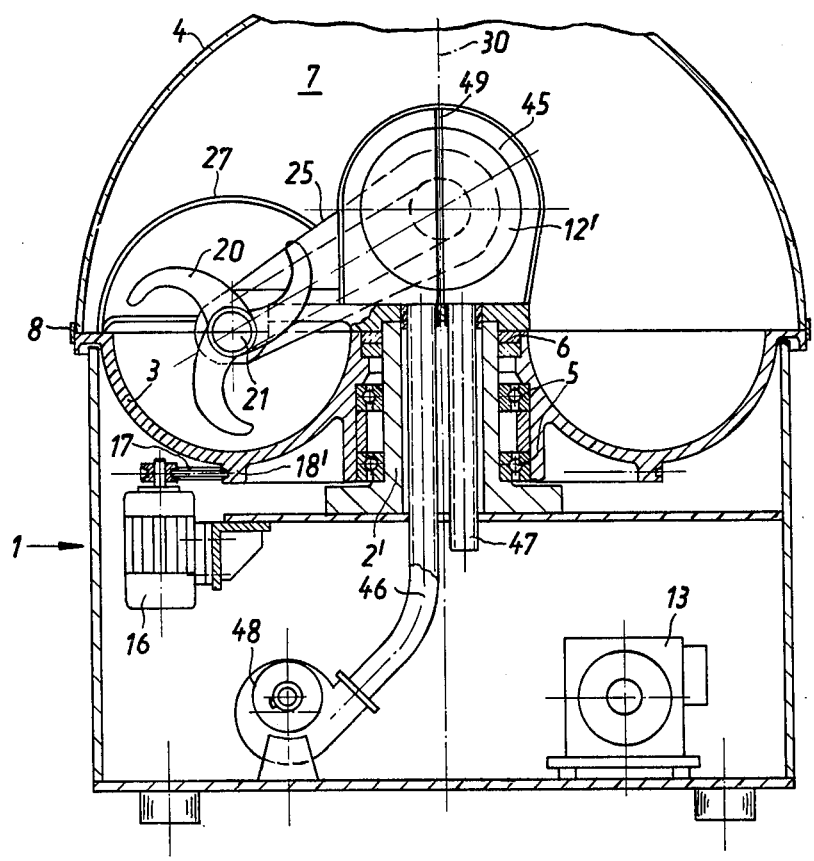
FIG. 6 is another embodiment of the vacuum cutter of FIG. 5 taken along line VI—VI.

In FIGS. 5 and 6, identical parts are designated by identical reference numerals, whereas substantially similar parts are designated by an apostrophe ('). In accordance with FIG. 5, the sealing ring 8' overlaps a flange 37 on the outer housing wall 38. In accordance with FIG. 6, a vacuum chamber which corresponds essentially to the processing chamber 7, is bordered by hood 4 and bowl 3. In accordance with FIG. 5, the bowl lies freely in the vacuum chamber bordered by the hood 4, housing wall 38 and intermediate wall 36. This vacuum chamber also surrounds the bearing block 2'. As a result, the sealing 6 can be thereby omitted.

In accordance with FIG. 5, the relatively slow running shaft 40 of the driving motor can be sealed off by a dynamic seal 41 in the region of the intermediate wall 36. The cutting shaft 21 is here held on a carrying plate 42 by means of a carrying arm or the like. The carrying plate 42 is secured at the upper end of the bearing block 2'. The rotatable bearing 31 can be omitted there, since the hood does not rotate.

The cutting shaft 21 is driven directly by an electrical motor 12' through a belt drive 25, in accordance with FIGS. 5 and 6. The electrical motor 12' is attached in a flange manner to a bearing bracket 43 arranged on the carrying plate 42. The motor is surrounded by a double covering 44 which seals off, airtight, the space between the carrying plate 42, the bearing bracket 43 and the housing of the electrical motor 12'.

The inner space or interior of the motor is, thereby, directly connected with the vacuum of the processing chamber 7, whereas the double covering chamber 45 is connected, on one hand, to an inlet channel 46 and, on the other hand, to an exit channel 47. Both channels are pipelines which pass through the hollow middle or center of the bearing block 2'. While the inlet channel 46 is connected to a blower 48 arranged at the lower part of the housing, the ventilating channel 47 enters directly in this chamber. This ventilating channel, however, can also be led to the exterior.

An angular-shaped separating wall 49 extends downward in longitudinal direction of the motor 12' and is situated between this motor and the carrying plate 42. This separating wall 49 is also rearward normal between the motor and the double cover 44. The double covering chamber 45 is subdivided by this separating wall 49 in a cooling loop, so that the cooling air delivered by the blower 48 passes over the motor in clockwise direction when seen in FIG. 6, and then flows again to the exterior through the exit channel 47. It is also, of course, possible to use another cooling medium in place of air. The channels 46, 47 are sealed off in the carrying plate 42, through static seal 50.

In both embodiments, a single dynamic seal 6 or 41 is solely required. Substantially low peripheral velocities appear in conjunction with the dynamic seal. Since the power for driving the bowl is low, the entire motor 16 can also be placed under vacuum in specific circumstances, so that dynamic seals can be completly omitted.

The entire cutting drive is here attached to the upper end of the bearing block 2', in the form of a closed unit. The electrical lines can also be completely exposed by swinging open the hood 4. This cutting drive can be removed and interchanged as a closed component upon loosening, for example, recessed hexagonal screws.

Figure 7:
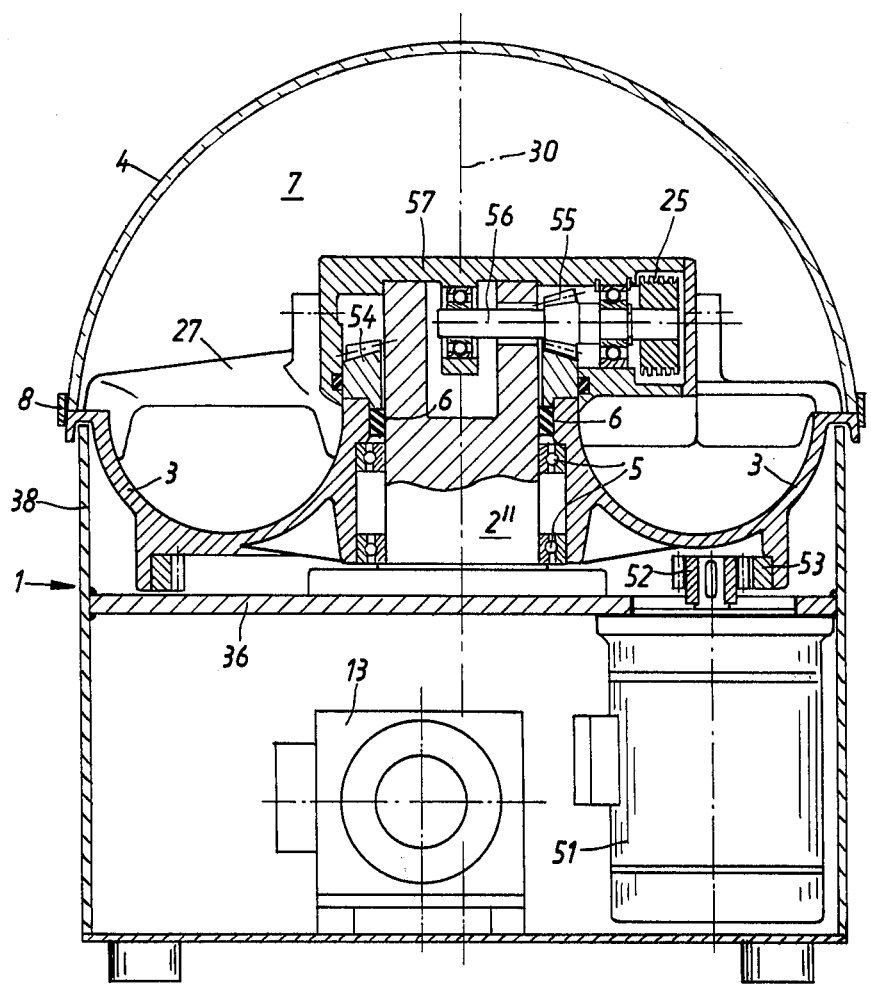
FIG. 7 is another embodiment of FIG. 6 in which the drive for the cutting mechanism is taken from the rotational motion of the bowl, in accordance with the present invention.

In the embodiment of FIG. 7, a common drive motor 51 is provided. The motor is attached from below to the intermediate wall 36 in a flanged manner. A pinion 52 on the motor shaft meshes directly with an internal gear 53 on the bowl 3. Accordingly, the bowl has applied to it the entire power required for driving the bowl and the cutting shaft, and the portion required for driving the cutter mechanism is taken off at the upper end of the bearing block 2'' from the relative rotation of the bowl with respect to the bearing block. The bearing block does not require here either electrical lines or cooling lines. Only a bevel gear 54 is arranged at the upper inner rim of the bowl. The bevel gear 54 meshes with a bevel pinion 55 on a pinion shaft 56 which is held by a bearing cap 57 radially with respect to the bowl rotational axis 30. The bearing cap 57 is attached at the upper end of the bearing block 2''. The cutting shaft can, from the pinion shaft 56, be set into particular motion, by being driven directly by the belt drive 25. In speed regulation, however, it is desirable to provide at least one intermediate belt arrangement, so that the required cutting speed may be achieved. In order to obtain this rotational speed even with different speeds of the bowl, it is also possible to provide a shifting arrangement for another mechanism with variable shifting. The seal can, thereby, be again selectively provided, when the hood 4 is seated on the rim of the bowl. The seal can also be omitted when the hood is heated on the housing wall 38 in accordance with FIG. 5. The drive shaft of the motor 51 must, thereby, be sealed off by means of a dynamic seal 41 as in FIG. 5.

In place of the electrical motors shown, it is also possible to apply other types of driving motors. In the embodiment of FIGS. 5 and 6, the cooling means can be omitted under certain circumstances as when the motor develops only substantially little heat, or when the motor converts the applied driving energy with low losses. It is also possible to transmit the driving torque for the cutting mechanism, by means of magnetic forces through a vacuum tight nonmagnetic wall into the processing chamber 7. Such a wall can, for example, be provided in or on a tube-shaped bearing block. The transmission of motion can, thereby, be accomplished by means of a magnetic coupling which operates on the basis of permanent magnets or eddy currents. It is also possible to provide on such a nonmagnetic wall, an electrical motor, particularly of the non synchronous induction type of motor, with the wall being exterior to the stator and interior to the rotor. Such a motor would be in the form of a disc type of motor, but the nonmagnetic wall can also have a nonplanar form.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

We claim:

1. A vacuum meat processing machine comprising in combination, an annular bowl having an axis of rotation and being rotationally symmetric and rotationally arranged about said axis of rotation, a rotating work processing tool reaching into said bowl; a cutting shaft supporting said work processing tool; a cutting shaft carrier for holding said cutting shaft with said work processing tool, said cutting shaft and said work processing tool comprising cutting means; a hood covering said bowl and said cutting shaft carrier; a vacuum chamber covered and bordered by said hood; a bearing block arranged in the center of said annular bowl, the cutting shaft carrier with said cutting shaft and said processing tool being arranged on said bearing block and being completely in said vacuum chamber.

2. The meat processing machine as defined in claim 1 including a static seal for sealing said bowl against said hood; and a dynamic seal for sealing said bowl against said bearing block.

3. The meat processing machine as defined in claim 2 including a tool driving motor on the exterior of the said vacuum chamber and in communication with the interior of said vacuum chamber.

4. The meat processing machine as defined in claim 3 including cooling means for remotely cooling said tool driving motor.

5. The meat processing machine as defined in claim 1 including, a tool driving motor in said vacuum chamber; a vacuum-type double cover surrounding said tool driving motor, said bearing block having inlet and exit channels, said double cover forming a double cover chamber communicating with a central cooling circuit through said channels.

6. The meat processing machine as defined in claim 5 including at least one separating wall for subdividing said double cover chamber in a central cooling loop with both ends connected respectively to the inlet and exit channels.

7. The meat processing machine as defined in claim 6 wherein said separating wall runs in longitudinal direction of said motor on at least the lower side of said motor.

8. The meat processing machine as defined in claim 1 including an intermediate wall for mounting said bearing block, said intermediate wall being closely inserted beneath said bowl; and a vacuum pump mounted beneath said intermediate wall.

9. The meat processing machine as defined in claim 1 including lower wall means surrounding said bowl; and a static seal between said hood and the rim of said lower wall means.

10. The meat processing machine as defined in claim 1 including means for driving said bowl; and means driving said cutting means from the motion of said bowl.

11. The meat processing machine as defined in claim 10 including a bearing block for supporting said cutting carrier; a gear pinion mounted on a pinion shaft held at the upper end of said bearing block; and gear means on said bowl meshing with said pinion.

12. The meat processing machine as defined in claim 1 including a pivoting arm connected to the center of said hood along the axis of said bowl; and pivoting means outside of said hood and pivotably connected to said arm.

13. The meat processing machine as defined in claim 12 wherein said hood has a semi-spherical shape and is made of transparent material.

14. A vacuum meat processing machine comprising, in combination, a bowl having an axis of rotation and being rotationally symmetric about said axis; a rotating cutting shaft; a work processing tool reaching into said bowl and supported by said cutting shaft; a cutting shaft carrier for holding said cutting shaft with said work processing tool, said cutting shaft and said work processing tool comprising cutting means; a hood covering said bowl and said cutting shaft carrier; a vacuum chamber formed by said hood and a lower wall means, at least a portion of said cutting means being completely in said vacuum chamber; a bearing block arranged on said axis of rotation of said bowl for supporting said cutting shaft carrier; a static seal for sealing said bowl against said hood; a dynamic seal for sealing said bowl against said bearing block; a tool driving motor on the exterior of said vacuum chamber and in communication with the interior of said vacuum chamber, said tool driving motor being mounted at the lower end of said bearing block, said bearing block having tube means for the passage of transmission means for driving said cutting means.

15. The meat processing machine as defined in claim 14, wherein said transmission means includes belt means for connecting said motor to said cutting shaft; and a reversing shaft transverse to the axis of said bowl at the upper end of said bearing block and coupled to said belt means.

* * * * *